Patented Apr. 26, 1938

2,115,473

UNITED STATES PATENT OFFICE 2,115,473

ANTIOXIDANTS

Waldo L. Semon, Silver Lake Village, Ohio, assignor to The B. F. Goodrich Company, New York, N. Y., a corporation of New York No Drawing. Application August 31, 1935, Serial No. 38,807

17 Claims. (Cl. 18—50)

This invention relates to the preservation of oxidizable organic substances, and particularly of rubber, and has as its object to provide a new type of antioxidants.

The antioxidants of this invention are compounds containing a secondary and a tertiary amino group attached to the same aromatic ring. The substituents on the amino groups may be any monovalent hydrocarbon groups, including both saturated and unsaturated, straight and branched chain aliphatic groups, cycloaliphatic groups, and aralkyl groups as well as purely aromatic or aryl groups, preferably those containing not more than ten carbon atoms. Typical members of this class of compounds are trimethyl phenylene diamine, dimethylamino diphenylamine, dimethylamino phenyl naphthylamine, diethylamino diphenylamine, dibutylamino diphenylamine, didodecyl amino diphenylamine, dicetylamino diphenylamine, di-isopropyl amino diphenylamine, diallylamino diphenylamine, dicyclohexylamino diphenylamine, dibenzylamino diphenylamine, phenyl-ethyl-amino diphenylamine, phenyl-benzyl-amino diphenylamine, methylamino triphenylamine, benzylamino triphenylamine, phenylamino triphenylamine, tolylamino triphenylamine, cumylamino triphenylamine, naphthylamino triphenylamine, naphthylamino trinaphthylamine, anthracylamino triphenylamine, N-phenyl N-tolyl N' tolyl phenylene diamine, and N-phenyl N-naphthyl N' phenyl naphthylene diamine. These compounds are all excellent antioxidants. The amino groups may occupy any positions on the aromatic ring, but para substituted compounds are preferred.

As a specific example of one embodiment of the invention a tire tread composition is prepared by mixing 100 parts by weight of rubber, 45 parts of carbon black, 5 parts of zinc oxide, 2 parts of pine tar, 2 parts of stearic acid, 3.25 parts of sulphur and 0.5 part of polybutylidene-aniline, along with 1 part of p-phenylamino triphenylamine. The composition is vulcanized in a mold for 45 minutes at 295° F. to give an optimum cure. The vulcanized composition deteriorates only a fraction as rapidly as the same composition without antioxidant, and furthermore is far more resistant to flex cracking, either fresh or after aging.

Comparable results are secured by the use of any of the other antioxidants enumerated above; for instance by substituting p-dimethylamino diphenylamine or p-dimethylamino-phenyl beta-naphthylamine for the p-phenylamino triphenylamine.

The antioxidants of this invention may be employed in practically any type of rubber composition or in compositions related to rubber such as gutta percha, balata, artificial rubber isomers, synthetic rubber and the like. They may be employed not only by mechanical incorporation into the rubber, but by application to its surface, or by mixing with liquid dispersions of rubber such as latex and rubber cement, and may be employed either alone or together with other antioxidants, accelerators, solvents, pigments and the like. They may likewise be used to retard the deterioration of other oxidizable organic materials including fatty oils and especially unsaturated oils such as the drying oils, soaps, cracked gasoline and other petroleum derivatives, aldehydes, essential oils and the like, by adding a suitable small proportion, say from 0.01 to 0.1% of one of these antioxidants.

The term "rubber" unless otherwise limited is employed in the appended claims in a generic sense to include caoutchouc, gutta percha, balata, reclaimed rubber, synthetic rubber, artificial rubber isomers and like products, whether vulcanized or unvulcanized and whether or not admixed with other bodies such as fillers, pigments, vulcanizing and accelerating agents.

I claim:

1. The method of preserving oxidizable materials which tend to deteriorate by absorption of oxygen from the air which comprises treating them with a compound consisting of a secondary amino and a tertiary amino group attached to a single aromatic ring composed of the elements carbon and hydrogen, the substituents on the amino groups being monovalent hydrocarbon groups containing not more than ten carbon atoms.

2. The method of preserving rubber which comprises treating rubber with a compound consisting of a secondary amino and a tertiary amino group attached to a single aromatic ring composed of the elements carbon and hydrogen, the substituents on the amino groups being monovalent hydrocarbon groups containing not more than ten carbon atoms.

3. The method of preserving rubber which comprises treating rubber with a compound consisting of a dialkylamino group and a monoarylamino group attached to a single aromatic ring composed of the elements carbon and hydrogen, the aryl substituent containing not more than ten carbon atoms.

4. The method of preserving rubber which comprises treating rubber with a p-dialkylamino diphenylamine.

5. The method of preserving rubber which comprises treating rubber with p-dimethylamino diphenylamine.

6. The method of preserving rubber which comprises treating rubber with p-dimethylamino-phenyl beta-naphthylamine.

7. The method of preserving rubber which comprises treating rubber with a mono-arylamino triarylamine.

8. The method of preserving rubber which comprises treating rubber with p-phenylamino triphenylamine.

9. The method of preserving vulcanized rubber which comprises vulcanizing rubber in the presence of p-phenylamino triphenylamine.

10. A composition of matter comprising an oxidizable organic material which tends to deteriorate by absorption of oxygen from the air preserved with a small proportion of a di-hydrocarbon-substituted-amino diarylamine.

11. A rubber composition which has been vulcanized in the presence of a compound consisting of a secondary amino and a tertiary amino group attached to a single aromatic ring composed of the elements carbon and hydrogen, the substituents on the amino groups being monovalent hydrocarbon groups containing not more than ten carbon atoms.

12. A rubber composition comprising rubber and a di-hydrocarbon-substituted-amino diarylamine.

13. A rubber composition comprising rubber and p-dimethylamino diphenylamine.

14. A rubber composition comprising rubber and p-dimethylamino-phenyl beta-naphthylamine.

15. A rubber composition comprising rubber and p-phenylamino triphenylamine.

16. The method of preserving rubber which comprises treating rubber with an N-diaryl N'-aryl p-arylene diamine.

17. A rubber composition comprising rubber and an N-diaryl N'-aryl p-arylene diamine.

WALDO L. SEMON.